United States Patent [19]

Blessing

[11] 4,388,141
[45] Jun. 14, 1983

[54] APPARATUS FOR FUSING STRIPS

[75] Inventor: Hubert Blessing, Dallas, Tex.

[73] Assignee: Levi Strauss & Co., San Francisco, Calif.

[21] Appl. No.: 212,352

[22] Filed: Dec. 3, 1980

Related U.S. Application Data

[62] Division of Ser. No. 79,977, Sep. 28, 1977, Pat. No. 4,259,131.

[51] Int. Cl.³ .................... B32B 31/00; B65C 1/00; D04F 61/00
[52] U.S. Cl. .................... 156/432; 156/438; 156/468; 156/555; 156/582; 156/324; 38/44; 100/93 RP
[58] Field of Search ............ 156/582, 555, 456, 391, 156/141, 478, 195, 481, 446, 448, 425, 432, 201, 324, 499, 296, 580, 459, 554, 438, 433, 463, 468, 344, 471, 544; 2/271; 242/47.09, 47.11, 47.1; 38/44, 70; 425/28 B; 432/8, 60, 59; 28/219, 244; 57/31, 32; 100/93 RP

[56] References Cited

U.S. PATENT DOCUMENTS

| | | | |
|---|---|---|---|
| 695,041 | 3/1902 | Fues | 100/93 RP |
| 1,585,620 | 5/1926 | Heany | 57/32 |
| 2,498,662 | 2/1950 | Eaby | 100/93 RP |
| 2,883,733 | 4/1959 | Notarbartolo et al. | 28/244 |
| 2,884,757 | 5/1959 | Davis | 57/31 |
| 2,929,437 | 3/1960 | Stevens | 156/438 |
| 3,502,534 | 3/1970 | Griset, Jr. | 156/584 |
| 3,666,596 | 5/1972 | Morton | 156/344 |
| 3,932,258 | 1/1976 | Brinkman et al. | 156/582 |

*Primary Examiner*—Jerome W. Massie
*Assistant Examiner*—Louis Falasco
*Attorney, Agent, or Firm*—Philip M. Shaw, Jr.

[57] ABSTRACT

Straps or belt loop strips are formed with the apparatus and method of the present invention by folding a strip of fabric about a strip of fusible material, threading the folded, combined strip back and forth between two side-by-side, counter-rotating cylinders so that, in the preferred embodiment, the strip forms a plurality of figure eight patterns over and between the two cylinders, and heating the cylinders to a temperature which is above the melting point of the fusible strip but below the scorching point of the material. The speed at which the cylinders are counter-rotated with respect to each other is chosen, in conjunction with the number of loops of the combined strip over the cylinders, to place the combined strip in contact with the heated surface for a length of time sufficient to accomplish complete fusing.

2 Claims, 4 Drawing Figures

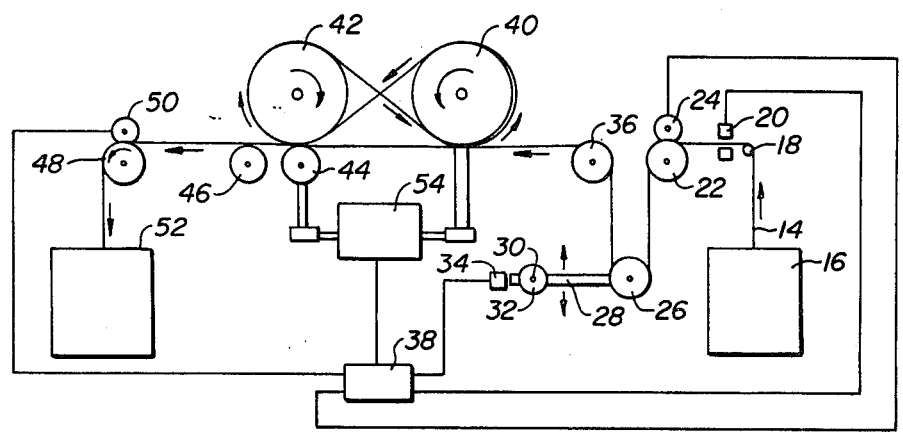
FIG._1.
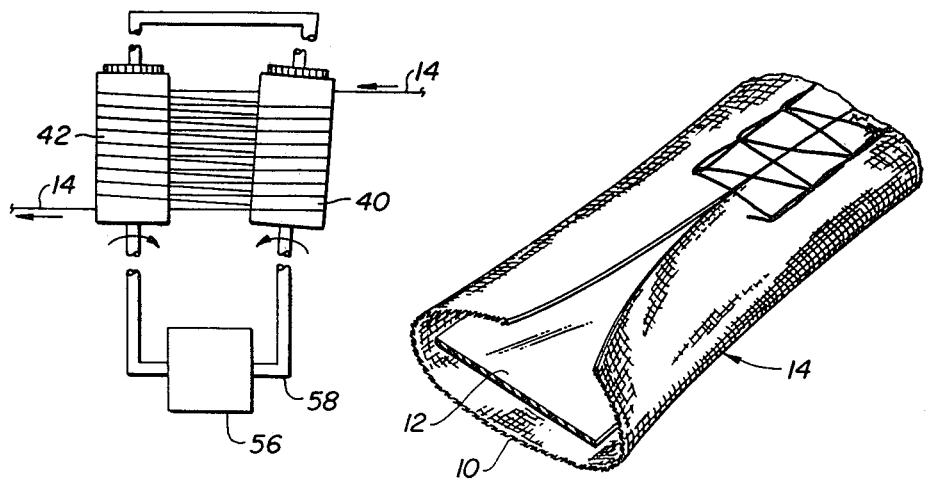
FIG._2.  FIG._4.

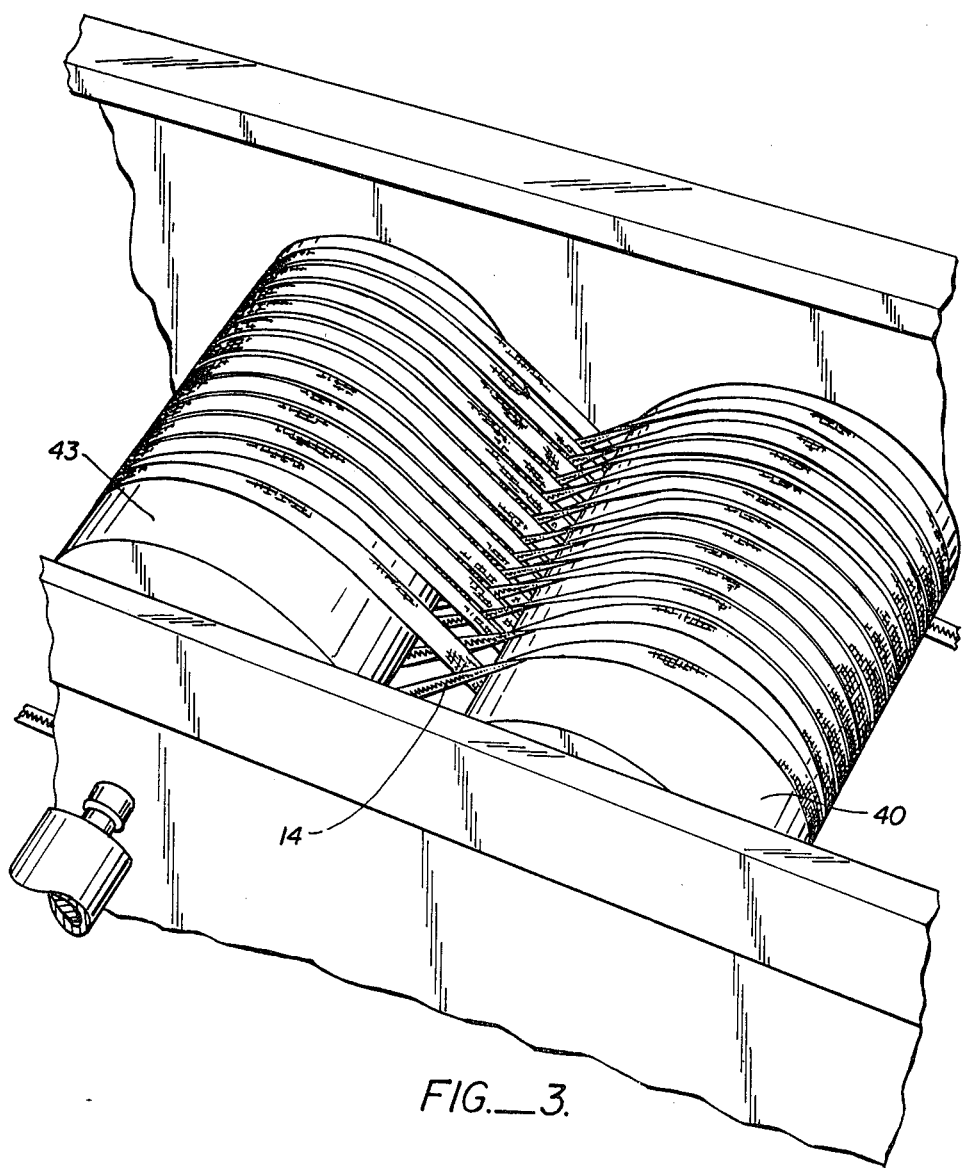
FIG._3.

APPARATUS FOR FUSING STRIPS

CROSS-REFERENCE TO RELATED APPLICATION

This application is divided from co-pending Application Ser. No. 079,977, filed Sept. 28, 1977 U.S. Pat. No. 4,259,131.

BACKGROUND OF THE INVENTION

This invention relates to an apparatus for forming fused strips, such as for use in straps or belt loops, for the manufacture of garments.

In the manufacture of garments, strips of fabric are folded over and sewn together to form garment support straps or, in some cases, loops which are then attached to the garment to support a belt. Conventional straps or belt loops are formed by folding a fabric strip over a stay and then sewing the edges of the folded fabric strip together. It has been proposed to form such strips from a single ply of fabric which has its edges folded and sewn together over a strip of heat fusible plastic. The entire folded strip is then subjected to a sufficient amount of heat for a sufficient length of time that the strip of plastic will fuse the folded over edges together so that the strip will retain a firm and folded configuration. The strip can then be cut into appropriate lengths to form straps or belt loops which are then sewn on to the garments.

One problem with such a proposal is that the melting point of the fusible material is only 50° F. or so less than the scorching point of the fabric. When heating the strip at a temperature which is below the scorching point of the fabric, a finite amount of time is required for the fusible plastic to become heated to its melting temperature in order that the fusing operation can proceed. Since these strips are most advantageously formed in continuous lengths, it is thus necessary to devise a pathway over which the strip can travel while being heated for the length of time sufficient to cause fusing to take place without scorching.

SUMMARY OF THE INVENTION

With the apparatus of the present invention, a fabric strip which is folded over a fusible strip is heated at the melting point of the fusible strip and below the scorching point of the fabric for a length of time sufficient to cause fusing to take place while traveling over a convoluted pathway which requires a minimum of floor space. The heating-fusing step is accomplished by entwining the two strips together, entraining the entwined strips on two side-by-side, counter-rotating cylinders so that, in the preferred embodiment, the entwined strips describe a plurality of side-by-side figure eight patterns between the two cylinders, and heating the cylinders to the melting point of the second or fusible strip of material.

In the preferred embodiment, the entwining step comprises folding the first or fabric strip in the direction of its width about the fusible strip to form a flat, combined strip with the fusible strip constituting a core. The edges of the fabric are then sewn together in a conventional manner. In order that the same surface of the sewn, combined strip will always be in contact with the two cylinders, and to reduce the probability that a strip portion passing from one cylinder to another will contact an adjacent, corresponding strip portion, the entraining step preferably includes twisting the combined strip 180°, or an integral multiple thereof, each time the combined strip passes from the first cylinder to the second cylinder.

In the preferred embodient, the cylinders are heated by passing a heated fluid, such as hot oil, through and in contact with the cylinders at the melting temperature of the fusible material. In other embodiments, the interior of the cylinders are heated by radiant heaters such as incandescent or infrared heaters.

In order to prevent the entrained, combined strip from creeping off of the ends of the cylinders, the axes of rotation of the cylinders are arranged to be non-parallel to each other. The spacing between the two axes of rotation is widest at the ends of the cylinders towards which the entrained strips would normally creep but for the non-parallelism.

Because the strip is drawn tight against the cylinders by their windlass action, the strip does not require further pressing to complete the fusing process.

It is therefore an object of the present invention to provide an apparatus for fusing a folded fabric strip about a fusible strip without scorching the fabric.

It is still another object of the invention to preform continuous lengths of belt strip material from a strip of fabric and a strip of fusible material with a minimum required of floor space.

It is still a further object of the invention to provide a low cost apparatus for forming a continuous length of fused, belt loop material, suitable for cutting into strips.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a schematic, elevational view illustrating the operation of the apparatus of the invention;

FIG. 2 is a partial, top schematic view of the heat cylinders and heating unit of the apparatus depicted in FIG. 1;

FIG. 3 is a partial schematic, perspective view illustrating the wrapping pattern of the belt loop strip on the heat cylinders; and FIG. 4 is an enlarged, perspective view of a portion of the belt loop strip prior to fusing.

DETAILED DESCRIPTION OF CERTAIN PREFERRED EMBODIMENTS

With reference particularly to FIG. 4, a continuous, flat strip of cloth 10 is folded and sewn by conventional means (not shown) about a continuous strip of heat fusible plastic 12. The strip of plastic 12 can be made from many synthetic, fusible materials such as, for example, polytetrafluorethylene manufactured by E. I. du Pont de Nemours & Co. under the trademark TEFLON. The composite flat strip 14 of the fabric strip 10 entwined about the fusible strip 12 is received at the fuser in rolls stored in a container such as container 16 depicted in FIG. 1.

Referring now more particularly to FIG. 1, the composite strip 14 is fed from the container 16 over a roller or support 18 and beneath a photoelectric sensor 20. The purpose of the sensor 20 is to detect the end of, or breaks in the strip 14. The strip 14 next passes over a pulley 22 which has a tension control servo motor wheel 24 pressing against it on the opposite side of the strip 14 so that together the wheels 24 and 22 provide a predetermined tension to the strip 14 as it is drawn through the fuser.

After leaving the wheels 22 and 24, the strip 14 passes beneath and around a pulley wheel 26 mounted on an arm 28 supported for rotation about a shaft 30 at the opposite end of the arm 28 and the wheel 26. An indicator 32 attached to the shaft 30 cooperates with the photosensor 34 to provide an indication that the wheel 26 has moved upward or downwardly, as viewed in FIG. 1, from some initially defined position. The strip 14, after leaving the wheel 26, extends upwardly and passes around still another pulley wheel 36. The purpose of the combination of the wheels 22, 26 and 36 is to provide means for detecting knots in the strip 14. The presence of a knot will cause a binding in the transport mechanism with the effect that the loop formed in the strip 14 about the wheel 26 will be shortened and will cause the arm 28 to rotate counter-clockwise and trip the sensor 34. As will be explained in greater detail hereinafter, the sensors 20 and 34 are connected to a central motor control 38 which controls the speed and sequencing of the operations of the fuser.

The composite strip 14 after leaving the pulley wheel 36 in the direction of travel indicated by the arrows in FIG. 1 passes beneath a cylinder 40 and another cylinder 42 arranged side by side with respect to the cylinder 40. The strip 14 passes first in a clockwise direction about the cylinder 42, leaves the cylinder 42 and then passes counter-clockwise about the cylinder 40. It next leaves the cylinder 40 and again passes beneath the cylinder 42 to again wrap about it in a clockwise direction. A first figure eight pattern of the composite strip 14 is thus formed about the cylinders 40 and 42. Note that the strip 14 is flat against the cylinder surfaces. As best illustrated in FIGS. 2 and 3, this figure eight pattern is repeated along the length of the cylinder until approximately thirteen such figure eight patterns have been formed at which point the strip 14 passes beneath the cylinder 42, over a squeegee roller 44 and a second roller 46. The composite strip 14 finally passes beneath a pair of motor driven draw rollers 48 and 50 to drop into a receiving container 52. Alternatively, the strip 14 could be wound up or fed directly to a further processing machine such as a cutter.

The cylinders 40 and 42 are counter-rotated with respect to each other by a conventional motor drive 54, whose details will not be explained since they do not form any part of the invention. This is further illustrated by the direction arrows in FIG. 1.

Referring now more particularly to FIG. 2, the cylinders 40 and 42 each have trackless outer cylindrical surfaces and are hollow and sealed at each end. Each cylinder contains another cylinder mounted concentrically within it to form an annular, hollow, circumferential space. These hollow, circumferential, annular spaces are interconnected by pipes 58 with a heating unit 56 which circulates a hot liquid through the cylinders. The annular space configuration minimizes temperature drops along the lengths of the cylinders. In the preferred embodiment, this hot liquid is hot oil at a temperature which is equal to or only slightly higher than the melting temperature of the fusible strip 12. This is approximately 330° to 450° F. Since the oil heater 56 is a commercially available electric oil recirculating process heating system, its details will not be described.

With reference again to FIG. 2, it can be seen that the cylinders 40 and 42 are rotated about their longitudinal axes. Although the cylinders 40 and 42 are located side by side, their axes of rotation are non-parallel. With the pattern of entraining the strip 14 over the cylinders 40 and 42 illustrated in FIG. 2, that is, with the strip passing from the cylinder 42 to wrap counter-clockwise about the cylinder 40 and leaving the cylinder 40 to wrap clockwise about the cylinder 42, the figure eight patterns of strip 14 thus formed would normally have a tendency to creep toward the cylinder ends near the top of FIG. 2 and possibly off the ends of the cylinders 40 and 42. By spacing the axes of rotation of the cylinders 40 and 42 further apart at the point where the strip 14 first begins to wrap about the cylinders 40 and 42 than at the opposite end of the cylinders, a slight bias is thus provided against the creep which tends to stabilize the pattern of the entrained strip.

One advantage of the present device is that when different fabric and fusible materials are used, the only adjustment which usually needs to be made is to increase or decrease the counter-rotational speed of the cylinders 40 and 42 so that the heat is applied to the strip portions in contact with the cylinders for the requisite amount of time for fusing, but not scorching, to take place at the preset oil temperature (which is selected to be less than the lowest fabric scorching temperature). The speed can be easily empirically determined.

While in the preferred embodiment the strips are wound in a figure eight pattern, in other less advantageous embodiments other winding patterns could be selected. Some such patterns might require that the cylinders be rotated in the same direction and have the disadvantage, among others, that less efficient utilization of the available cylinder surface is achieved, thereby requiring a slower rotational speed and less production.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

What is claimed is:

1. Apparatus for heat fusing a flat strip of a first material to a flat strip of a second material which has a melting point lower than the scorching point of the first material, and wherein at least one of the two strips is continuous, the apparatus comprising:

a pair of side-by-side drums which counter-rotate about non-parallel axes of rotation, each drum having a smooth, cylindrical, outer surface upon which the flat strips of material can be wound in contact with each other in a plurality of figure eight wrappings and wherein at least one of the drums is comprised of a first cylinder and a second cylinder mounted concentrically within the first cylinder to form a hollow, cylindrically shaped space therebetween;

means for heating the cylindrical, outer surfaces of the drums to the melting point of the second material, including means for circulating a hot fluid longitudinally through the annular space between the first and second cylinders whereby the temperature drop along the length of the outer surface of the first cylinder is minimized, and adjustable means for counter-rotating the drums at a selected speed whereby the strips travel back and forth over portions of the cylindrical, outer surface of each drum for a predetermined period of time selected to ensure fusing of the strip of the second material into the strip of the first material.

2. Apparatus as recited in claim 1 wherein the hot liquid is hot oil at a temperature of between 330° and 450° F.

* * * * *